United States Patent [19]

Taylor

[11] 4,420,492

[45] Dec. 13, 1983

[54] METHOD FOR SHUCKING BIVALVE MOLLUSKS USING MICROWAVE ENERGY

[75] Inventor: Leonard S. Taylor, Silver Spring, Md.

[73] Assignee: University of Maryland, College Park, Md.

[21] Appl. No.: 399,164

[22] Filed: Jul. 19, 1982

[51] Int. Cl.³ .............................................. A22C 29/04
[52] U.S. Cl. .................................... 426/241; 426/643; 426/479
[58] Field of Search .............................. 426/241–243, 426/643, 479, 520

[56] References Cited

U.S. PATENT DOCUMENTS

| | | | |
|---|---|---|---|
| 2,601,421 | 6/1952 | Thaning | 426/241 |
| 2,824,004 | 2/1958 | Seal | 426/479 X |
| 3,007,801 | 11/1961 | Lapeyre et al. | 426/479 X |
| 3,070,834 | 1/1963 | Carpenter | 99/451 X |
| 4,340,611 | 7/1982 | McKinney et al. | 426/241 |

FOREIGN PATENT DOCUMENTS 682945  3/1964  Canada ............................... 426/643

OTHER PUBLICATIONS

Copson, D. A., "Microwave Heating", The Avi Publishing Co., Inc. Westport, Conn., 1962, pp. 4–11.

*Primary Examiner*—Robert A. Yoncoskie
*Attorney, Agent, or Firm*—Howard L. Rose

[57] ABSTRACT

A method for shucking an oyster, or other bivalve mollusk, by selectively heating the adductor muscle or muscles thereof with microwaves.

13 Claims, 3 Drawing Figures

OYSTER

INSULATED LOOP APPLICATOR

WAVEGUIDE APPLICATOR

METHOD FOR SHUCKING BIVALVE MOLLUSKS USING MICROWAVE ENERGY

TECHNOLOGICAL CONTENT OF THE INVENTION

The popularity of the oyster is well-known. Oyster shells among the remains of prehistoric kitchens uncovered along the eastern coast of Jutland suggest that oysters were a favored food in even the early times of man. During the Roman Era, the oyster gained particular notariety as a delicacy served at orgies. Later, others espoused the beliefs that the eating of oysters provided a healing or amatory effect on the consumer. Over the years, it has been recognized that the oyster which moves little and works less has very little muscle and is, thus, a fine succulent food.

Since its tastiness was first recognized, the problem with the oyster has been the opening or shucking of the oyster. The oyster is a bivalve mollusk, having a two-shell structure which contains the edible portion of the oyster. The shells are held together in a closed position by an adductor muscle. The adductor muscle consists of (a) two types of fibers which operate to rapidly close the two shells and (b) smooth muscle fibers which react slowly and serve to hold the shells in a closed position with minimal expenditure of energy. It is the adductor muscle which is devoted to holding the two shells together and which must be operated on in order to open or shuck the oyster.

In opening the oyster shell, the early Romans used a triangular punch which, although it opened the shells, resulted in the introduction of grit to the edible portion. Modern oyster shuckers insert a thin knife between the two shells and sever the adductor muscle. A professional oyster shucker opens oysters at a speed of eight or nine oysters per minute and there are reliable reports of rates of over thirty oysters per minute. Commercial oyster shucking is a tedious, low-paid (albeit skilled) job. Oyster shuckers are thus becoming a vanishing race, notwithstanding the great popularity of the oyster.

In response to oyster shucking problems, mechanical oyster shuckers have been suggested but have been unsuccessful for various reasons.

Also in response to the problem, others have thought of exploiting the fact that an oyster will open upon heating. In this regard, it has long been known that a cooked oyster will open. Early experiments by R.J. Learon and W. R. Stone, in fact, indicate that heating an oyster in a microwave oven will cook and open the oyster. (See article entitled "Microwave Opening of Oysters—Some Economic Considerations." *Microwave Energy Application Newsletter,* volume 2, page 9, 1969.) Although achieving the end of opening the oyster, these techniques have the notable disadvantage of heating and cooking the oyster while it is being opened. Where one of the greatest gastronomic pleasures of eating oysters is eating the oyster raw, if not icy and chilled, the prior techniques of heating the oyster have proved less than optimal.

SUMMARY OF THE INVENTION

In order to effectuate oyster shucking in a manner which is efficient, effective, and avoids the problems of prior oyster shucking techniques, a method is disclosed in which the adductor muscle is separated from the shell by locally and selectively heating the adductor muscle with microwave radiation.

Unlike other techniques which cook the entire oyster while performing the opening operation, the present method heats only a small spot at the adductor muscle leaving the remaining portion of the oyster raw and even icy. It is thus a major object of the invention to shuck an oyster—except for a small portion at the adductor muscle—remains cold and raw.

Specifically, in accordance with the present invention, a microwave device is placed over the shell of the oyster so that microwave energy is directed toward the adductor muscle. This portion is identified on the inner surface of the shell by a blue-dyed oval area. On the outside of the shell, however, there is no such indicator although the attachment area—which is approximately 1 cm in diameter—is generally centered at a location two-thirds of the distance from the hinge along the longest cord of the shell. According to the invention, it is an object to place a microwave device, which provides a beam having a width approximately equal to the attached area, over that portion of the shell which is two-thirds the distance from the hinge along the longest chord.

Also, according to the method of the invention, it is a further object to open the shells of an oyster by separating the adductor muscle from the inner surface of the oyster shell by applying microwave energy to essentially only the adductor muscle through the shell at a prescribed frequency, for a prescribed time period, and at a prescribed power level.

Finally, it is an object of the invention to provide a method of opening bivalve mollusks which are similar in structure to the oyster by directing microwaves onto the adductor muscles thereof.

DESCRIPTION OF THE INVENTION

Figure 1:
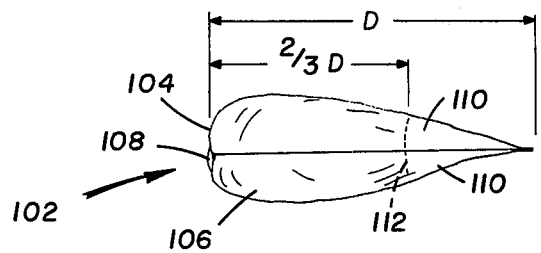
FIG. 1 is a front view of an oyster with shells closed.

Referring to FIG. 1, an oyster 102 is shown. The oyster 102 includes a first shell 104 and a second shell 106 coupled to the first shell 104 with an uncalcified ligament hinge 108. The shells 104 and 108 consist of a leathery outer peristacum layer, a thick central layer of chalky matter, and a thinner nacreous pearly layer which are relatively lossless and penetrable by S-Band fields. Extending from one end of the oyster 102 to the other is a longest dimension D of an imaginary chord C (see FIG. 2). At an area centered approximately two-thirds of the distance, ⅔D, from the hinge 108 along the chord C is an attachment area 110 on the inner surface of each shell 104 and 106. Each attachment area 110 is generally approximately 1 cm in diameter and is readily identified on the inner shell by a blue-dyed spot (not shown).

Extending between the two attachment areas 110 is an adductor muscle 112. The adductor muscle 112 is fibrous and, to some extent, porous. Water is thus contained within the adductor muscle 112. When the adductor muscle 112 is taut, the shells 104 and 106 are closed together as shown in FIG. 1. When the adductor muscle 112 is not flexed, the shells 104 and 106 are open about the hinge 108.

Figure 2:
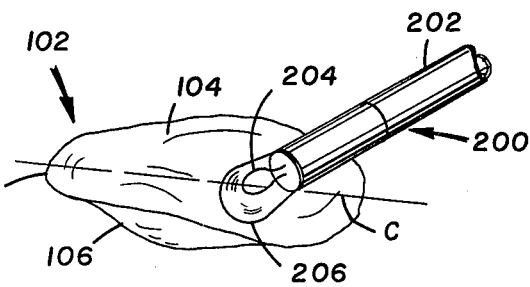
FIG. 2 is a perspective illustration of an insulated loop microwave applicator directing microwave energy through the shell of an oyster onto the adductor muscle thereof.
Figure 3:
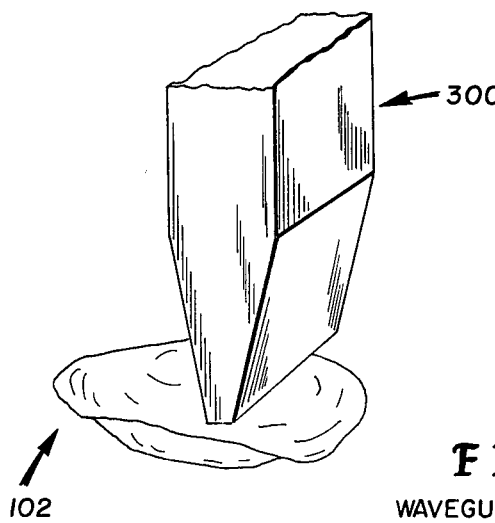
FIG. 3 is a perspective illustration of a waveguide microwave applicator directing microwave energy through the shell of an oyster onto the adductor muscle thereof.

Referring to FIGS. 2 and 3, an insulator loop applicator 200 and a waveguide applicator 300 are shown laying over the attachment area 110 (see FIG. 1) of the oyster 102. (The same reference numerals, it is noted, are provided for the same elements in each figure.) In FIG. 2, a coaxial cable 202 is formed into a loop 204 at its end. The loop 204 is preferably approximately 1 cm in diameter and is placed against the shell 104 over the attachement area 110. Covering the loop 204 is a plastic material 206 through which microwaves freely pass. The plastic material 206 is provided to maintain the loop structure and may, optionally, be omitted. The loop 204 is positioned along the outer surface of the shell 104 at a position approximately two-thirds of the distance from the hinge 108 along the cord C.

In an embodiment according to FIG. 2, a source of 290 watts is provided to the loop 204. The loop 204 is matched by a triple-stub tuner to each oyster—this task being automatically performable by known technology. The loop 204, having a 1 cm diameter and applying approximately 145 watts of continuous wave power at a frequency of approximately 2.45 GHz, cleanly separates the adductor muscle 112 (see FIG. 1) from the shells 104 and 106 in approximately 20-25 seconds.

The separation occurs in response to the local, selective application of microwave energy to the adductor muscle 112 and to no other edible portion of the oyster 102. The microwave energy passes through the lossless, penetrable shell 104, the attachment area 110—i.e., the interface between the adductor muscle 112 and the inner surface of the shell 104—being in the near field region of the applicator 200. A tendon-like layer of tissue (not specifically shown) immediately proximate the inner surface of the shell 104 heats rapidly as the microwave energy is applied. Water in this portion of the adductor muscle 112 also heats rapidly. In response to the heating, the portion is apparently denatured and "blown off" the shells 104 and 106 by the steam formed in the adductor muscle 112.

The waveguide applicator 300 of FIG. 3 operates similarly. The applicator 300 is placed over the attachment area 110 (of FIG. 1) of oyster 102.

The insulated loop applicator 200 has been shown, in experiments, to greatly focus the microwave energy onto only the attachment area 110 (of FIG. 1). To enhance the power efficiency, a conventional microwave reflector (not shown) has been provided as an option. The reflector, it is noted, is of a design which does not direct an undesired amount of heat onto portions of the oyster other than the adductor muscle.

It should, of course, be noted that the present invention is not restricted to the specific frequencies, times, and power requirements indicated above. For example, frequencies greater than 1 GHz are contemplated—provided the energy can penetrate the shell and into the adductor muscle. Frequencies in the S-Band, which penetrate the shell, are thus contemplated. S imilarly, effective powers of 1000 watts and more are also within the contemplated scope of the invention. In fact, the greater the microwave power applied to the adductor muscle, the less time the separation—and shucking—process takes. That is, while 145 watts of power sould free the adductor muscle after 20-25 seconds, 1000 watts should free the adductor muscle in a much shorter time, for example 5-6 seconds. Further there is no limitation as to what type of microwave applicator is provided. That is, any conventional type of microwave antenna which effects the desired local heating of the adductor muscle may be employed.

In accordance with the invention, an oyster is shucked cleanly and effectively while the oyster—except for a warm portion at the adductor muscle—remains raw and even chilled.

It should further, of course, be noted that the oyster is a bivalve mollusk and has a structure similar to other bivalve mollusks which are edible, preferably in a raw, chilled form. Thus, although described primarily as an oyster shucker, the present method also extends to other bivalve mollusks—like clams—which operate and react in a manner similar to oysters. In this regard, it is noted that some bivalve mollusks have more than one adductor muscle for cases, microwaves are selectively directed through a shell onto each adductor muscle.

Other improvements, modifications and embodiments will become apparent to one of ordinary skill in the art upon review of this disclosure. Such improvements, modifications and embodiments are considered to be within the scope of this invention as defined by the following claims.

I claim:

1. A method of opening an oyster wherein the oyster includes (a) two shells which are hinged together at one end and have edible contents therebetween, and (b) an adductor muscle coupled to and extending between the respective inner surfaces of the two shells, the adductor muscle selectively moving the shells together and apart, the method comprising the step of:
   locally heating the adductor muscle of the oyster;
   wherein, except for a spot at the adductor muscle, at least substantially all the contents of the opened oyster remain raw and unheated.

2. A method according to claim 1 wherein the local heating step comprises the step of:
   directing microwave energy through a shell of the oyster onto the adductor muscle.

3. A method according to claim 2 wherein the local heating step further comprises the step of:
   applying the directed microwave energy onto the adductor muscle for a time and at a power level sufficient to open said oyster.

4. A method according to claim 1 wherein the local heating step comprises the steps of:
   placing a microwave loop antenna over the outer surface of one of the shells at a location beneath which the adductor muscle is attached; and
   generating microwave power at the loop antenna.

5. A method according to claim 4 wherein the placing step comprises the steps of:
   defining a longest chord extending from the hinge to the point of the oyster furthest from the hinge;
   locating a point on the shell a distance two-thirds the length of the longest chord measured from the hinge; and
   centering the loop antenna over the located point.

6. A method according to claim 5 wherein the power generating step comprises the steps of:
   applying microwave power through the shell to the adductor muscle at a power level and for period of time sufficient to open said oyster.

7. A method according to claim 6 wherein the microwave power applying step comprises the step of:

applying S-Band continuous wave microwave radiation at a power level of at least 145 watts for a period of at least 25 seconds.

8. A method according to claim 6 wherein the microwave power applying step comprises the step of:
applying S-Band continuous wave microwave radiation at a power level of at least 1000 watts.

9. A method according to claim 1 wherein the local heating step comprises the steps of:
placing a microwave waveguide over the outer surface of one of the shells at a location beneath which the adductor muscle is attached to the inner surface of the one shell; and
generating microwave power at the waveguide.

10. A method according to claim 9 wherein the placing step comprises the steps of:
defining a longest chord extending from the hinge to the point of the oyster furthest from the hinge;
locating a point on the shell a distance two-thirds the length of the longest chord measured from the hinge; and
centering the microwave waveguide over the located point.

11. A method of opening a bivalve mollusk, wheren the bivalve mollusk includes (a) two shells which are hinged together at one end and have edible contents therebetween, and (b) at least one adductor muscle coupled to and extending between the respective inner surfaces of the two shells, the at least one adductor muscle selectively moving the shells together and apart, the method comprising the step of:
locally heating at least one adductor muscle of the bivalve mollusk;
wherein, except for a spot at the adductor muscle, at least substantially all the contents of the opened bivalve mollusk remain raw and unheated.

12. A method according to claim 11 wherein the local heating step comprises the step of:
directing microwave energy through a shell of the bivalve mollusk onto each adductor muscle.

13. A method according to claim 12 wherein the local heating step further comprises the step of:
applying the directed microwave energy onto at least one adductor muscle for a time and at a predetermined power level sufficient to open said bivalve mollusk.

* * * * *